United States Patent
Tiirola et al.

(10) Patent No.: US 11,641,594 B2
(45) Date of Patent: May 2, 2023

(54) DOWNLINK CONTROL CHANNEL MONITORING

(71) Applicant: Nokia Technologies Oy, Espoo (FI)

(72) Inventors: Esa Tapani Tiirola, Kempele (FI); Lars Dalsgaard, Oulu (FI); Jorma Johannes Kaikkonen, Oulu (FI); Kari Pekka Pajukoski, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 16 days.

(21) Appl. No.: 16/475,564

(22) PCT Filed: Jan. 2, 2018

(86) PCT No.: PCT/IB2018/050024
§ 371 (c)(1),
(2) Date: Jul. 2, 2019

(87) PCT Pub. No.: WO2018/127802
PCT Pub. Date: Jul. 12, 2018

(65) Prior Publication Data
US 2019/0342777 A1  Nov. 7, 2019

Related U.S. Application Data

(60) Provisional application No. 62/442,693, filed on Jan. 5, 2017.

(51) Int. Cl.
*H04W 4/00* (2018.01)
*H04W 24/08* (2009.01)
*H04W 84/04* (2009.01)

(52) U.S. Cl.
CPC .......... *H04W 24/08* (2013.01); *H04W 84/042* (2013.01)

(58) Field of Classification Search
CPC .................................................... H04L 5/0048
See application file for complete search history.

(56) References Cited

U.S. PATENT DOCUMENTS 9,215,705 B2 * 12/2015 Seo .................. H03M 13/6525
9,603,034 B2 *  3/2017 Sartori ............. H04W 72/0406
(Continued)

FOREIGN PATENT DOCUMENTS

CN     104937865 A    9/2015
EP     2 509 378 A1  10/2012
(Continued)

OTHER PUBLICATIONS

*DL Control Channel Design for NR*, R1-1612120, 3GPP TSG RAN WG1 Meeting #87, MediaTek Inc. (Nov. 2016) 4 pages.
(Continued)

*Primary Examiner* — Guang W Li
(74) *Attorney, Agent, or Firm* — Alston & Bird LLP (57) ABSTRACT

Various communication systems may benefit from the appropriate monitoring of communication channels. For example, certain wireless communication systems may benefit from downlink control channel monitoring optimized for discontinuous reception mode and/or narrowband operation. A method can include selecting a search space configuration from a plurality of search space configurations for a user equipment. The method can also include operating the user equipment in the selected search space configuration.

20 Claims, 6 Drawing Sheets

(56) References Cited

U.S. PATENT DOCUMENTS

| | | | |
|---|---|---|---|
| 10,149,287 B2* | 12/2018 | Huss | H04W 72/042 |
| 10,448,372 B2 | 10/2019 | Bagheri et al. | |
| 10,728,800 B2* | 7/2020 | Suzuki | H04W 76/27 |
| 10,873,976 B2* | 12/2020 | Cirik | H04L 5/0098 |
| 2011/0243090 A1* | 10/2011 | Grovlen | H04W 72/042 |
| | | | 370/329 |
| 2011/0261767 A1 | 10/2011 | Ji et al. | |
| 2012/0046027 A1* | 2/2012 | Baker | H04L 5/0096 |
| | | | 455/422.1 |
| 2013/0058294 A1 | 3/2013 | Miki et al. | |
| 2013/0114485 A1 | 5/2013 | Vannithamby et al. | |
| 2013/0194956 A1 | 8/2013 | Sartori et al. | |
| 2013/0301434 A1* | 11/2013 | Krishnamurthy | H04B 7/0617 |
| | | | 370/252 |
| 2014/0098775 A1 | 4/2014 | Horiuchi et al. | |
| 2014/0126506 A1* | 5/2014 | Horiuchi | H04W 72/1273 |
| | | | 370/329 |
| 2014/0211717 A1 | 7/2014 | Jitsukawa | |
| 2014/0254452 A1 | 9/2014 | Golitschek Edler Von Elbwart et al. | |
| 2014/0293946 A1* | 10/2014 | Suzuki | H04L 5/0053 |
| | | | 370/329 |
| 2014/0348092 A1* | 11/2014 | Ihm | H04J 11/00 |
| | | | 370/329 |
| 2014/0362758 A1 | 12/2014 | Lee et al. | |
| 2015/0092690 A1* | 4/2015 | Seo | H04L 5/0053 |
| | | | 370/329 |
| 2015/0117240 A1 | 4/2015 | Liang et al. | |
| 2015/0280881 A1* | 10/2015 | Gao | H04L 5/0053 |
| | | | 370/329 |
| 2015/0304086 A1* | 10/2015 | Kim | H04W 72/042 |
| | | | 370/329 |
| 2016/0149672 A1* | 5/2016 | Shimezawa | H04L 1/1607 |
| | | | 370/329 |
| 2016/0302174 A1* | 10/2016 | Chatterjee | H04W 72/06 |
| 2016/0337093 A1* | 11/2016 | Horiuchi | H04L 5/001 |
| 2018/0020408 A1 | 1/2018 | Zhang et al. | |
| 2018/0124748 A1* | 5/2018 | Baldemair | H04W 74/0833 |
| 2018/0220485 A1 | 8/2018 | Su et al. | |
| 2019/0068338 A1* | 2/2019 | Ashraf | H04L 1/0038 |
| 2019/0081688 A1* | 3/2019 | Deenoo | H04B 7/088 |
| 2019/0104543 A1* | 4/2019 | Park | H04L 1/001 |
| 2019/0141711 A1* | 5/2019 | Fu | H04L 5/00 |
| 2019/0289513 A1* | 9/2019 | Jeon | H04L 5/0098 |
| 2020/0213985 A1* | 7/2020 | Baldemair | H04W 72/042 |
| 2020/0305129 A1* | 9/2020 | Lee | H04W 72/0446 |
| 2020/0366533 A1* | 11/2020 | Ji | H04L 5/0058 |

FOREIGN PATENT DOCUMENTS

| | | |
|---|---|---|
| EP | 2 683 098 A2 | 1/2014 |
| EP | 2 704 513 A1 | 3/2014 |
| EP | 3 461 221 A1 | 3/2019 |
| EP | 3459197 A1 | 3/2019 |
| EP | 3535896 B1 | 9/2019 |
| EP | 3681221 A1 | 7/2020 |
| RU | 2553983 C2 | 6/2015 |
| RU | 2581614 C2 | 4/2016 |
| WO | WO 2010/070197 | 6/2010 |
| WO | WO 2015/013871 A1 | 2/2015 |
| WO | WO 2016/006859 | 1/2016 |
| WO | WO 2016/161982 A1 | 10/2016 |
| WO | WO 2017/193212 A1 | 11/2017 |
| WO | WO 2017/200729 A1 | 11/2017 |
| WO | WO 2018/084758 A1 | 5/2018 |
| WO | WO 2018/128468 A1 | 7/2018 |

OTHER PUBLICATIONS

Extended European Search Report for Application No. 18736151.4 dated Aug. 4, 2020, 8 pages.
*Forward Compatible Control Channel Framework for NR*, R1-167327, 3GPP TSG-RAN WG1 #86, InterDigital Communications (Aug. 2016) 5 pages.
Office Action and Search Report for Russian Application No. 2019122904/08(044740) dated Mar. 5, 2020, 11 pages.
3GPP TR 38.913 V14.0.0, $3^{rd}$ Generation Partnership Project; Technical Specification Group Radio Access Network; Study on Scenarios and Requirements for Next Generation Access Technologies; (Release 14) (Oct. 2016) 39 pages.
*On Techniques for Enhanced UE Power Efficiency*, R1-1609557, 3GPP TSG RAN WG1 Meeting #86bis, MediaTek Inc. (Oct. 2016) 5 pages.
*LS on UE RF Bandwidth Adaptation in NR*, R1-1613663, 3GPP TSG-RAN WG1 Meeting #87, RAN WG1 (Nov. 2016) 1 page.
GPP Draft; Final_ReportWG1#68_v100. RAN WG1, R1-120764 Discussion of EPDCCH search space to support narrow bandwith operation, NR—Jeju, South Korea; Mar. 26, 2012-Mar. 30, 2012; p. 67, line 1—p. 73, line 30.
3GPP Draft; R1-155027 Search space configuration for M-PDCCH, PD—Oct. 4, 2015, AU—Ericsson, NR—Malmo, Sweden; Oct. 5, 2015-Oct. 9, 2015, URL—http://www.3gpp.org/ftp/Meetings_3GPP_SYNC/RAN1/Docs/.
International Search Report and Written Opinion for Application No. PCT/IB2018/050024 dated May 23, 2018.
Office Action for Indian Application No. 201947031429 dated May 31, 2021, 7 pages.
Decision to Grant for Russian Application No. 2019122904/08 dated Jun. 17, 2020, 20 pages.
Final Rejection for Korean Application No. 10-2019-7022780 dated Mar. 16, 2021, 8 pages.
Notice of Allowance for Korean Application No. 10-2019-7022780 dated Jun. 24, 2021, 3 pages.
Office Action for Australian Application No. 2018206059 dated Nov. 3, 2021, 3 pages.
Office Action for Korean Application No. 10-2019-7022780 dated Sep. 8, 2020, 13 pages.
Office Action for Chinese Application No. 201880012721.0 dated Sep. 5, 2022, 14 pages.
Office Action for Australian Application No. 2018206059 dated Oct. 11, 2022, 2 pages.
Notice of Acceptance for Australian Application No. 2018206059 dated Nov. 4, 2022, 3 pages.
Huawei et al., "Mechanisms of Bandwidth Adaptation for Control and Data Reception in Single-Carrier and Multi-Carrier Cases", 3GPP TSG RAN WG1 Meeting #87, R1-1611655, (Nov. 14-18, 2016), 4 pages.
InterDigital Communications, LLC, "On Search Space Design for ePDCCH in Rel-11", 3GPP TSG RAN WG1 Meeting #68, R1-120140, (Feb. 6-10, 2012), 3 pages.
Motorola, "Search Space Definition: Reduced PDCCH Blind Detection for Split PDCCH Search Space", 3GPP TSG RAN1 #51bis, R1-080079, (Jan. 14-18, 2008), 3 pages.
Qualcomm Incorporated, "Adaptive Bandwidth for Control and Data", 3GPP TSG-RAN WG1 #87, R1-1612070, (Nov. 14-18, 2016), 5 pages.
ZTE, "Detailed Solutions to Support Larger PDSCH/PUSCH Bandwidth for MTC", 3GPP TSG RAN WG1 Meeting #87, R1-1612593, (Nov. 14-18, 2016), 6 pages.
ZTE, "Further Consideration on Higher Data Rates in eMTC", 3GPP TSG-RAN WG2 Meeting #96, R2-167692, (Nov. 14-18, 2016), 6 pages.

* cited by examiner

DOWNLINK CONTROL CHANNEL MONITORING

RELATED APPLICATION

This application was originally filed as Patent Cooperation Treaty Application No. PCT/IB2018/050024 filed Jan. 2, 2018 which claims priority benefit to United States Provisional Patent Application No. 62/442,693, filed Jan. 5, 2017.

BACKGROUND

Field

Various communication systems may benefit from the appropriate monitoring of communication channels. For example, certain wireless communication systems may benefit from downlink control channel monitoring optimized for discontinuous reception mode and/or narrowband operation.

Description of the Related Art

Figure 1:
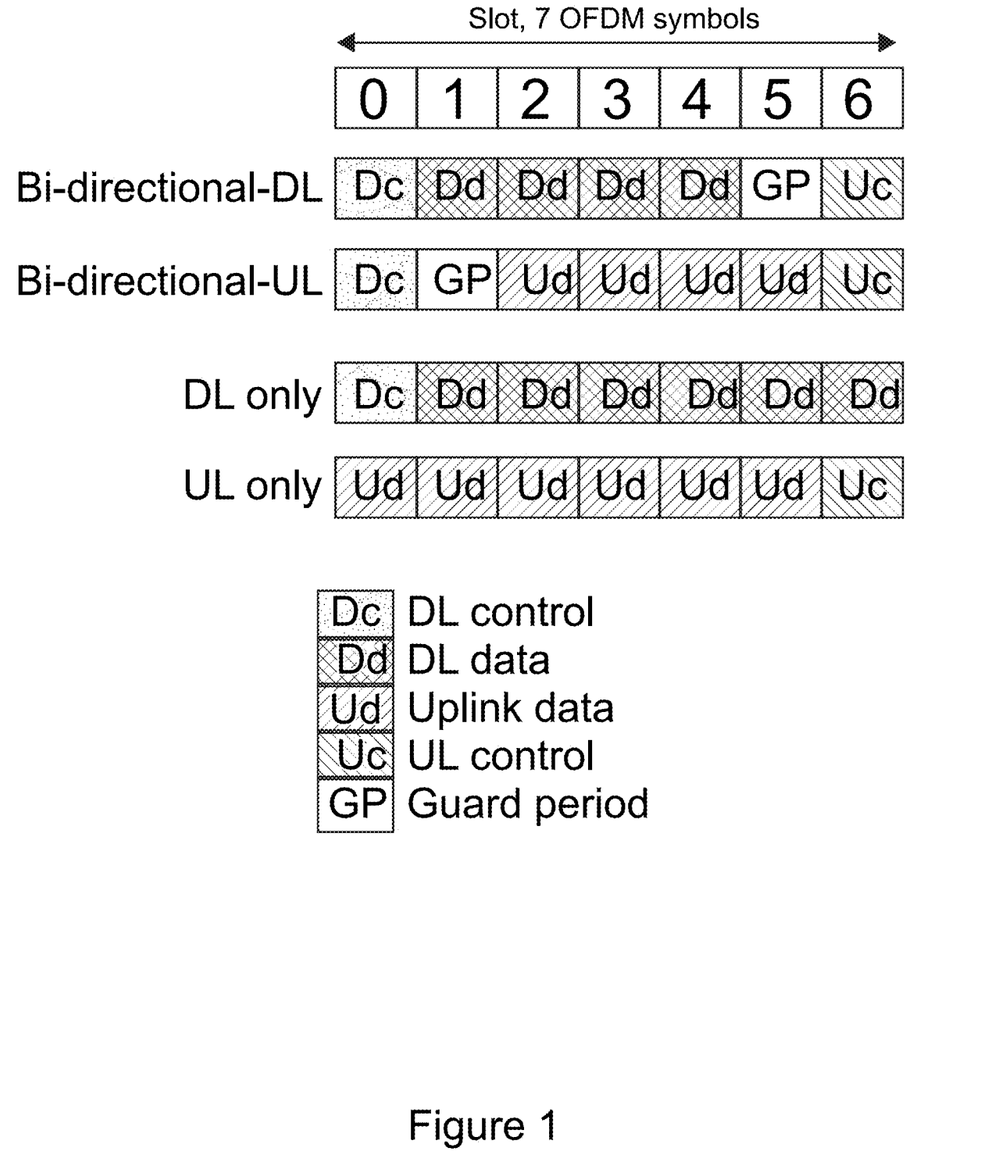
FIG. 1 illustrates slot types in new radio (NR).

FIG. 1 illustrates exemplary slot types in new radio (NR). More particularly, Figure shows frame structure that can be applied in NR. The slot length, as well as the portion of the orthogonal frequency division multiplexed (OFDM) symbols reserved for downlink (DL) control, DL data, guard period, uplink (UL) data and UL control as well as cyclic prefix (not shown in the figure) length may vary according to scenario/use case. There are three slot types shown in FIG. 1. These three slot types provide the basic support for both time division duplex (TDD) and frequency division duplex (FDD). NR may strive for efficient support of dynamic resource allocation of different numerologies in frequency division multiplexed (FDM)/time division multiplexed (TDM) fashion.

For the bi-directional slots, there is either downlink data or uplink data transmission in each slot, as well as the corresponding downlink and uplink control. Bi-directional slot facilitates many TDD functionalities in the NR frame structure, such as link direction switching between DL and UL; fully flexible traffic adaptation between DL and UL; and opportunity for low latency, provided that slot length is selected to be short enough.

In all slots, multiplexing among DL control, DL/UL data, GP and UL control is based primarily on time division multiplexing allowing fast energy efficient pipeline processing of control and data in the receiver. Physical downlink control channel (PDCCH) is conveyed in the DL control symbol(s) located at the beginning of the slot.

In addition to bi-directional slots, there are also DL slots and UL slots in FIG. 1. These are needed at least in FDD mode, but also in certain TDD scenarios to allow longer transmission periods in the same direction.

Figure 2:
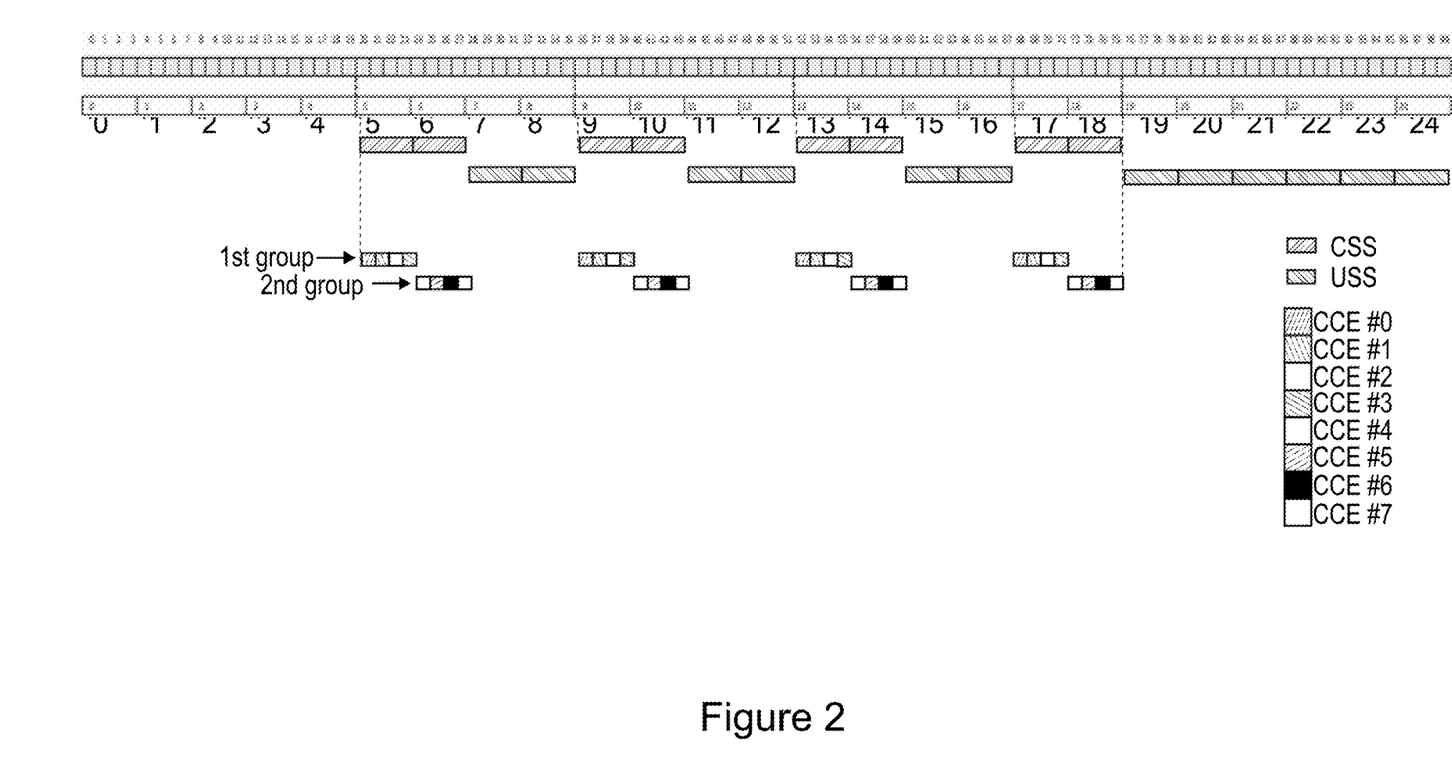
FIG. 2 illustrates an example arrangement for PDCCH search spaces including also CCE allocation for the CSS.

FIG. 2 illustrates an example arrangement for PDCCH search spaces including also control channel element (CCE) allocation for the common search space (CSS). In LTE, (enhanced) PDCCH ((E)PDCCH) carries downlink control information (DCI), which includes resource assignment and other control information for a user equipment (UE) or group of UEs. Each PDCCH is transmitted using one or more control channel elements (CCE). Different PDCCH sizes with different CCE aggregation levels (comprising 1, 2, 4 or 8 CCEs) are supported in LTE Rel-8.

In LTE, UE needs to decode all possible PDCCH sizes and locations in order to act on those messages with correct cyclic redundancy code (CRC) scrambled with a UE identity. Carrying out such blind decoding of all possible combinations (of PDCCH sizes and locations) in every subframe may lead to excessive power consumption and processing time requirements at the UE side as well as increased probability of false UL/DL grant detection. In order to limit the number of blind decoding attempts, LTE system has adopted an approach in which only a limited set of CCE locations where a PDCCH may be placed is defined for each UE. This processing reduction is made at the expense of PDCCH scheduling flexibility. The limited CCE set is considered as a PDCCH search space, which is divided into common part with 6 PDCCH candidates and dedicated part with 16 candidates, respectively. These candidates need to be decoded twice as there are two size options defined for the PDCCH both in common and in dedicated search space. This gives the maximum number of PDCCH blind decoding attempts (=44), which the LTE Rel-8 UE is required to carry out in any subframe. UE's PDCCH blind detection capability increases linearly with the number of DL CCs supported in LTE Carrier aggregation (i.e. Rel-10 and beyond).

PDCCH structure including search space design in NR is completely open in third generation partnership project (3GPP). However, there may be two types of search spaces, common search space (CSS) and user-specific search space (USS). They can be arranged in the frequency domain for example according to the following principles: next generation Node B (gNB) can configure both CSS and USS in a flexible manner in frequency; CSS may always be located in the first OFDM symbol of the slot (or in the case of narrowband operation requiring a high number of CCEs, such as 8, CSS may be located within first two OFDM symbols of the slot); and USS may have more flexibility in time. For example, USS may cover one or more OFDM symbols at the beginning of the slot, or USS may be located in the first symbol of the mini-slot. Configuration can be done according to a 4 physical resource block (PRB) raster. CCE size can be 4 PRBs in one orthogonal frequency division multiplexed (OFDM) symbol corresponding to 48 subcarriers (4×12 subcarriers).

Both localized and distributed CCEs are supported. Localized CCE can be made up of four consecutive PRBs within a 4-PRB raster. In the example of FIG. 2, USS follows localized CCE allocation. Distributed PRBs can be allocated in 4-CCE groups. In the example of FIG. 2, CSS follows distributed CCE allocation.

Figure 3:
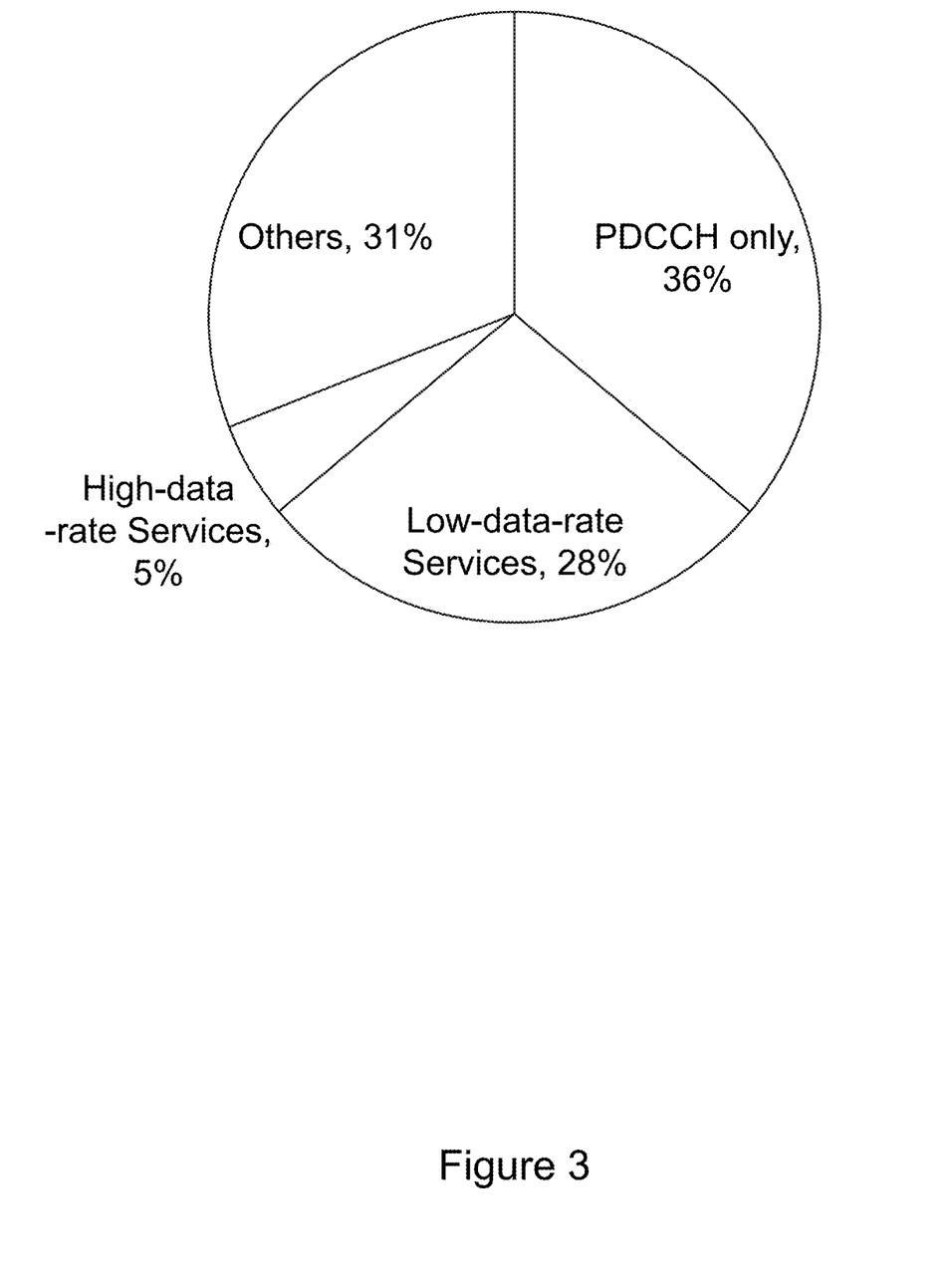
FIG. 3 illustrates distribution of daily UE modem power consumption for 20 MHz, as explained in R1-1609557.

FIG. 3 illustrates distribution of daily UE modem power consumption for 20 MHz, as explained in R1-1609557. PDCCH blind detection can be seen as a considerable burden for the UE. According to R1-1609557, around 64% of daily UE power consumption is occupied by PDCCH-only and low data rate services, as shown in FIG. 3.

There are some techniques to reduce the power consumption by PDCCH only and low data rate services. These include, for example, improved micro-sleep and dynamic bandwidth adaptation based on traffic needs. While (E)PDCCH blind detection techniques may address some issues, as can be seen from FIG. 3 significant improvement may still be needed.

BRIEF DESCRIPTION OF THE DRAWINGS:

For proper understanding of the invention, reference should be made to the accompanying drawings, wherein.

DETAILED DESCRIPTION:

Certain embodiments relate to 3GPP New Radio (NR) physical layer design and related 3GPP study item (SI), RP-160671, although embodiments are not limited to these examples. An objective of the SI is to identify and develop technology components needed for NR systems being able to use any spectrum band ranging at least up to 100 GHz. The goal is to achieve a single technical framework addressing all usage scenarios, requirements, and deployment scenarios defined in 3GPP TR 38.913.

Certain embodiments more particularly relate to conveying DL control information (DCI) within an NR carrier. DCI transmitted by gNB can be used, for example, for conveying downlink (DL) and uplink (UL) scheduling information to a UE. For example, certain embodiments relate to PDCCH blind detection arrangement in the case when the UE is operating in DRX mode. This mode targeting minimization of UE power consumption may or may not involve dynamically varying RF bandwidth.

One of the issues related to LTE is that conventionally UE needs to constantly monitor PDCCH covering the entire DL carrier bandwidth. Certain embodiments provide some practical enablers for improved operation for PDCCH-only and low data services in the NR.

In certain embodiments, a UE can be configured with two or more search space configurations. The two example configurations described below are designated configuration (config) A and configuration B, merely for convenience and ease of reference, and not by way of limitation.

Configuration A can correspond to search space configuration for the case when UE is having active data transmission. This may be a case when, for example, a UE is neither in the "DRX" nor in the "low data rate service" mode, if supported. This configuration can be characterized by one or more of the following attributes: search space(s) cover a wide bandwidth; search space(s) cover a high number of CCEs; UE operates with a high number of PDCCH blind decoding attempts per slot or per mini-slot (or per subframe); UE is monitoring all required PDCCH from both slots and mini-slots; UE is operating with radio frequency (RF) bandwidth up to a bandwidth corresponding to maximum channel bandwidth; and UE has a large data volume in at least one link direction, either DL or UL.

Configuration B can correspond to search space configuration for the case when UE is operating, for example according to a DRX mode or only having limited data service ongoing. This configuration can be characterized by one or more of the following attributes: search space(s) cover a narrow bandwidth; search space(s) cover a low number of CCEs; UE operates with a low number of PDCCH blind decoding; UE is monitoring PDCCH at maximum with slot resolution at least in DRX mode; UE is operating with RF bandwidth corresponding to a subset of the maximum channel bandwidth; and UE is supporting a limited data volume in at least in at least one link direction, either DL or UL.

The switching between the different configurations, in this example between configuration A and configuration B, can be based on switching from narrow bandwidth (BW) to wider BW or from wider BW to lower BW.

In the case of switching from narrow BW to wider BW, the gNB can indicate to the UE explicitly which configuration to use. This may be done using L1 DL control signaling (such as DCI) or a medium access control (MAC) control element (CE). The gNB may provide suitable reference signal (RS) resources for frequency/time synchronization and automatic gain control at the UE. Another form of configuration indication is implicit signaling, in which the UE is allocated resources corresponding to a wider BW. Alternatively, if the UE has a CSS specific configuration (e.g. configuration B) and UE is allocated resources, the UE can switch to another configuration, such as configuration A.

Switching from wider bandwidth to lower bandwidth could be based on the gNB indicating to the UE explicitly which configuration to use. Alternatively, the switching could be based on timer procedures, such as when a certain predefined amount of time has passed.

Thus, in certain embodiments, the UE may have at least two USS configurations defined by higher layer signaling. The first USS configuration can be used when the UE is operating according to configuration A. The second USS configuration can be used when the UE is operating according to configuration B.

In one embodiment, when operating according to configuration B, the UE may follow only a PDCCH common search space. In another embodiment, the CSS can be defined according to configuration B. For example, the CSS can be configured according to a certain maximum bandwidth. Maximum CSS bandwidth may cover at maximum X MHz when operating at a certain frequency band. For example, X could be ~5 MHz when operating in frequency bands smaller or equal than 6 GHz.

In yet another embodiment, configuration B may contain only predetermined PDCCH aggregation levels, which may, in turn, limit the number of PDCCH blind decoding attempts. For example, when operating according to configuration A, the UE may follow all PDCCH aggregation levels (e.g. AL=1, AL=2, AL=4, AL=8), while when operating according to configuration B, the UE may follow PDCCH aggregation levels (AL)≥4.

In one possible embodiment configuration A and configuration B can also be used by the network to reduce the power consumption dynamically, by limiting the required transmission of the gNB correspondingly.

In certain embodiments, both CSS and USS(s) can be configured via higher layer signaling. CSS configuration may be cell specific or UE group specific. USS configuration(s) may be defined based on dedicated RRC signaling.

Figure 4:
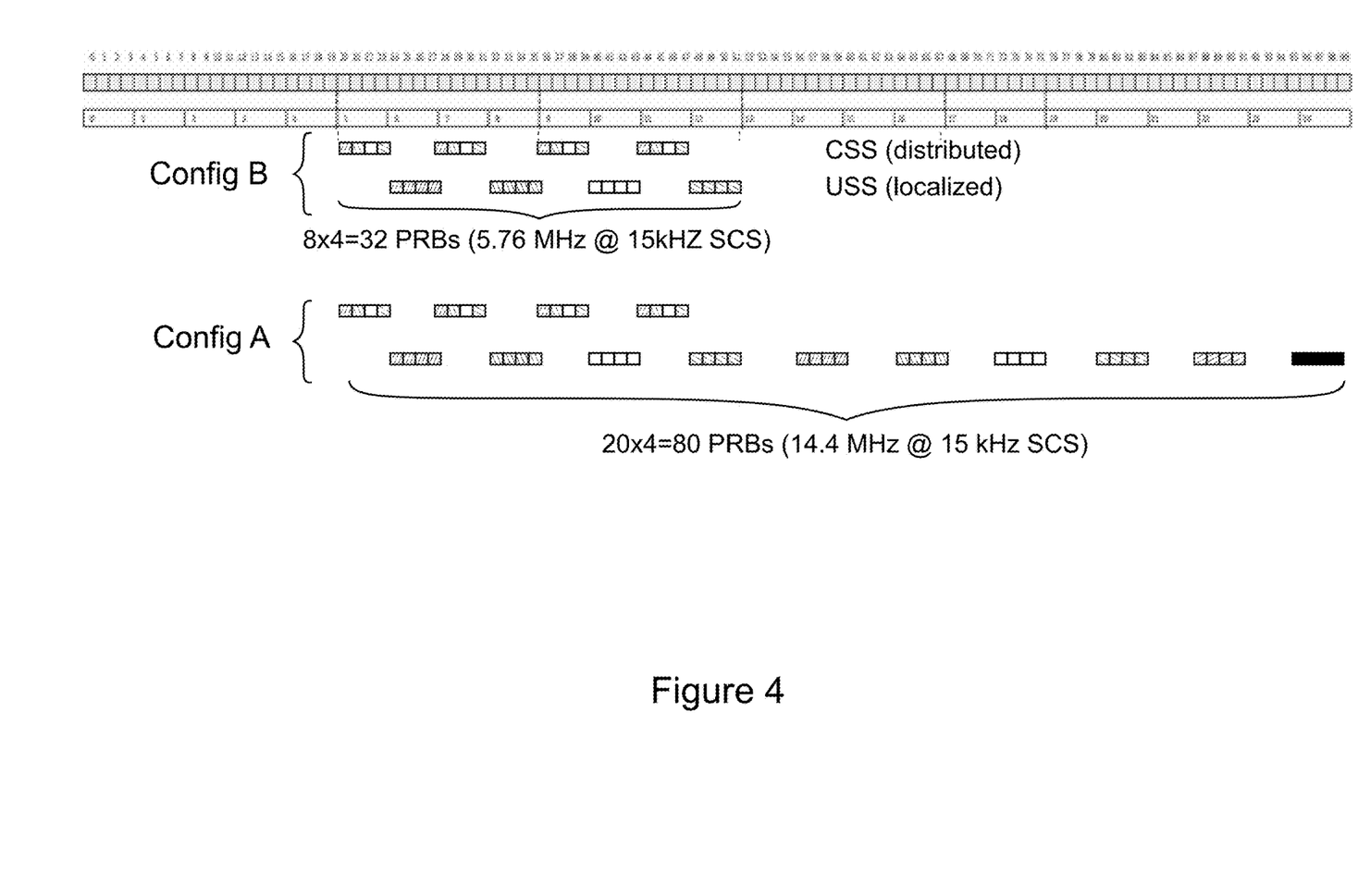
FIG. 4 illustrates examples of common search space/user specific search space configurations for configuration A and configuration B, according to certain embodiments.

FIG. 4 illustrates examples of CSS/USS configurations for configuration A and configuration B, according to certain embodiments. As illustrated in FIG. 4, configuration A can include CSS with four CCEs arranged in a distributed manner, and USS 10 CCEs arranged in a localized manner, respectively. Bandwidth allocation covers 80 physical resource blocks (PRBs) in total. By contrast, configuration B can include CSS with four CCEs arranged in a distributed manner, and USS with four CCEs arranged in a localized manner. Bandwidth allocation covers 32 PRBs in total. Although example shown in FIG. 4 covers only one carrier, the principle can also be extended to cover carrier aggregation and other bandwidth extension schemes.

In general, there could be more than two configurations. The different configurations could be used according to need for bandwidth, which could be due to, for example, high data rates, load balancing, or the like. For instance the bandwidth could be adjusted based on the instant data throughput (TP) needs such that when there is need for high TP, the configuration using, for example, the full available bandwidth, would be used, while when the data TP need is lower, a configuration using, for example, half the available bandwidth, could be used. This adaptation of used configurations could be flexible and done on the fly based on, for example, TP need.

Figure 5:
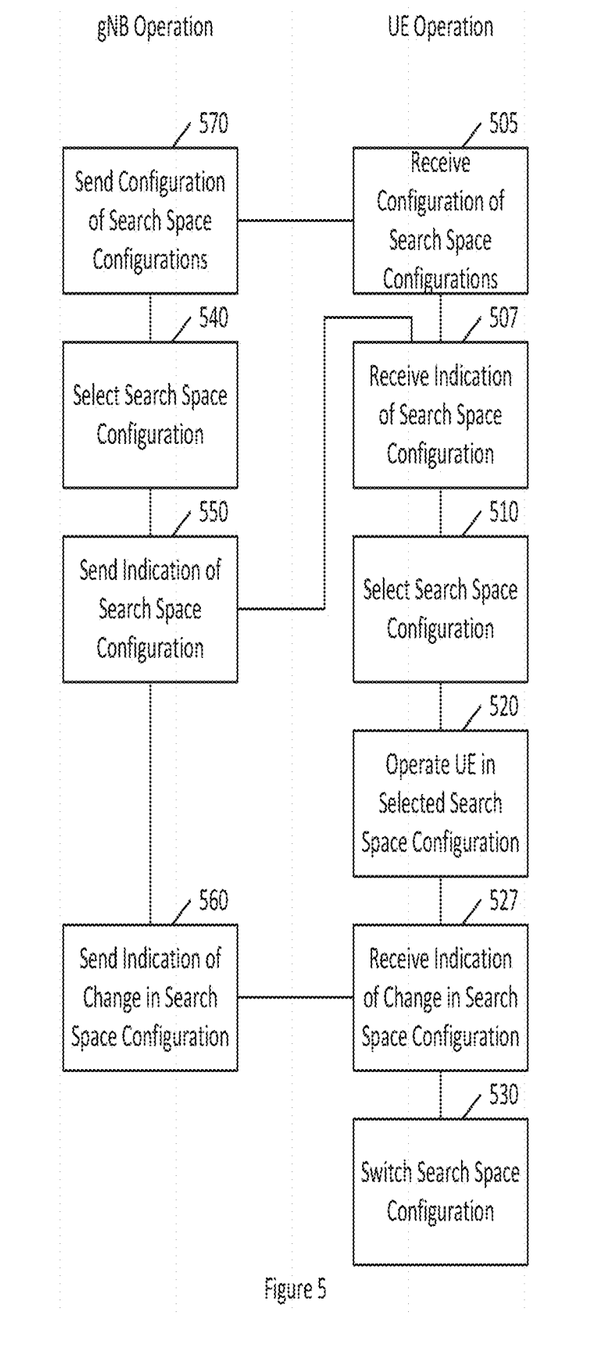
FIG. 5 illustrates a method according to certain embodiments.

FIG. 5 illustrates a method according to certain embodiments. As shown in FIG. 5, a method can include, at 510, selecting a search space configuration from a plurality of search space configurations for a user equipment. The plurality of search space configurations can respectively cover at least two different bandwidths. For example a first configuration can cover a first bandwidth and a second configuration can cover a second bandwidth that is different from the first bandwidth. The method can also include, at 520, operating the user equipment in the selected search space configuration. The operating of the user equipment can include performing physical downlink control channel blind detection.

The method can further include, at 530, switching between search space configuration.

The selecting at 510 and/or the switching at 530 can be based on need for bandwidth. The switching at 530 can also or alternatively be based on the expiration of a timer. The selecting at 510 and/or switching at 530 can be based on an explicit or implicit indication received from an access node at 507 and/or 527. Switching can involve, for example, switching from configuration A to configuration B or from configuration B to configuration A. Switching from configuration B to configuration A may require an additional synchronization signal. Whereas switching from configuration A to configuration B can rely on a timer and can be combined with a discontinuous reception procedure.

The method can further include receiving, at 505, configuration of the plurality search space configurations by higher layer signaling.

The plurality of search space configurations can be variously divided. For example, the plurality of search space configurations can include a first search space configuration configured to support a user equipment in active data transmission and a second search space configuration configured to support a user equipment in discontinuous reception mode or in a low data rate service mode.

For another example, the plurality of search space configurations can include a first search space configuration configured to cause the user equipment to follow all physical downlink control channel aggregation levels and a second search space configuration configured to cause the user equipment to follow only a subset of physical downlink control channel aggregation levels.

For a further example, the plurality of search space configurations can include a first search space configuration configured to cause the user equipment to follow both a common search space and a user specific search space and a second search space configuration configured to cause the user equipment to follow only a common search space. In another alternative, one or more of the plurality of search space configurations can configure the user equipment only to follow a user specific search space.

In certain embodiments, the plurality of search space configurations can include different user specific search spaces from one another.

The above features of the method may be performed by a device such as a user equipment. The following features of the method may be performed by another device, such as an access node, for example a next generation Node B (gNB).

The method can include, at 540, selecting a search space configuration from a plurality of search space configurations for a user equipment. The method can also include, at 550, indicating to the user equipment the selected search space configuration. This can be the same indication received at UE at 507. The method can also include, at 560, sending an indication to the user equipment to switch to a different search space configuration of the plurality of search space configurations. This can be the same indication received at UE at 527. The method can also include sending, at 570, a configuration of the plurality of search space configurations. This configuration can be the same configuration received at UE at 505.

Figure 6:
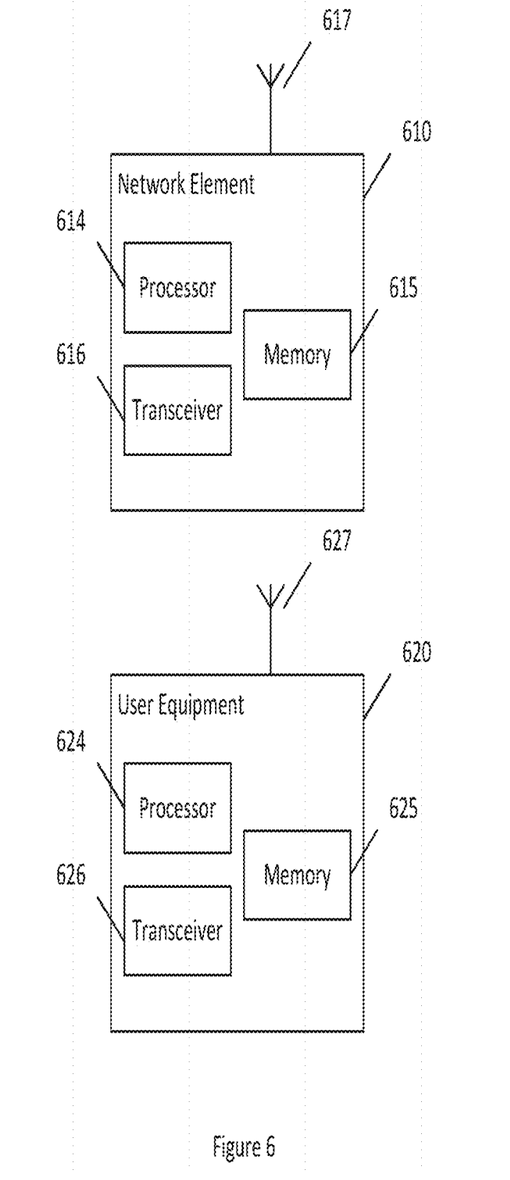
FIG. 6 illustrates a system according to certain embodiments.

FIG. 6 illustrates a system according to certain embodiments of the invention. It should be understood that each block of the flowchart of FIG. 5 may be implemented by various means or their combinations, such as hardware, software, firmware, one or more processors and/or circuitry. In one embodiment, a system may include several devices, such as, for example, network element 610 and user equipment (UE) or user device 620. The system may include more than one UE 620 and more than one network element 610, although only one of each is shown for the purposes of illustration. A network element can be an access point, a base station, an eNode B (eNB), a gNB, or any other network element.

Each of these devices may include at least one processor or control unit or module, respectively indicated as 614 and 624. At least one memory may be provided in each device, and indicated as 615 and 625, respectively. The memory may include computer program instructions or computer code contained therein, for example for carrying out the embodiments described above. One or more transceiver 616 and 626 may be provided, and each device may also include an antenna, respectively illustrated as 617 and 627. Although only one antenna each is shown, many antennas and multiple antenna elements may be provided to each of the devices. Other configurations of these devices, for example, may be provided. For example, network element 610 and UE 620 may be additionally configured for wired communication, in addition to wireless communication, and in such a case antennas 617 and 627 may illustrate any form of communication hardware, without being limited to merely an antenna.

Transceivers 616 and 626 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. It should also be appreciated that according to the "liquid" or flexible radio concept, the operations and functionalities may be performed in different entities, such as nodes, hosts or servers, in a flexible manner. In other words, division of labor may vary case by case. One possible use is to make a network element to deliver local content. One or more functionalities may also be implemented as a virtual application that is provided as software that can run on a server.

A user device or user equipment 620 may be a mobile station (MS) such as a mobile phone or smart phone or multimedia device, a computer, such as a tablet, provided with wireless communication capabilities, personal data or digital assistant (PDA) provided with wireless communication capabilities, vehicle, portable media player, digital camera, pocket video camera, navigation unit provided with wireless communication capabilities or any combinations thereof. The user device or user equipment 620 may be a sensor or smart meter, or other device that may usually be configured for a single location.

In an exemplifying embodiment, an apparatus, such as a node or user device, may include means for carrying out embodiments described above in relation to FIG. 5.

Processors 614 and 624 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors. Additionally, the processors may be implemented as a pool of processors in a local configuration, in a cloud configuration, or in a combination thereof. The term circuitry may refer to one or more electric or electronic circuits. The term processor may refer to circuitry, such as logic circuitry, that responds to and processes instructions that drive a computer.

For firmware or software, the implementation may include modules or units of at least one chip set (e.g., procedures, functions, and so on). Memories 615 and 625 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network element 610 and/or UE 620, to perform any of the processes described above (see, for example, FIG. 5). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments of the invention may be performed entirely in hardware.

Furthermore, although FIG. 6 illustrates a system including a network element 610 and a UE 620, embodiments of the invention may be applicable to other configurations, and configurations involving additional elements, as illustrated and discussed herein. For example, multiple user equipment devices and multiple network elements may be present, or other nodes providing similar functionality, such as nodes that combine the functionality of a user equipment and an access point, such as a relay node.

Certain embodiments may have various benefits and/or advantages. For example, certain embodiments may provide for reduced UE power consumption when operating in a DRX mode. Additionally, certain embodiments may permit adaptation of bandwidth usage based on need. Thus, certain embodiments may permit scalable UE power consumption, scalable gNB transmission BW, and reduced interference. Certain embodiments can leverage DRX functionalities for bandwidth adaptation (both within carrier and in combination with carrier aggregation). Additionally, certain embodiments may provide that RF bandwidth adaptation can be based on actual instant need, for example, data TP need and when operating in DRX mode.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

LIST OF ABBREVIATIONS

NR New Radio
DRX Discontinuous Reception
DCI Downlink Control Information
RF Radio Frequency
PDCCH Physical Downlink Control Channel
TDD Time Division Duplexing
DL Downlink
UL Uplink
GP Guard Period
EPDCCH Enhanced PDCCH
CCE Control Channel Element
LTE Long Term Evolution
CC Component Carrier
PRB Physical Resource Block
CSS Common Search Space
USS User specific Search Space
BW Bandwidth According to a first embodiment, a method can include selecting a search space configuration from a plurality of search space configurations for a user equipment. The method can also include operating the user equipment in the selected search space configuration. The plurality of search space configurations can respectively cover at least two different bandwidths.

In a variant, the method can further include switching between search space configuration.

In a variant, the selecting can be based on need for bandwidth.

In a variant, the switching can be based on a change in need for bandwidth.

In a variant, the switching can be based on the expiration of a timer.

In a variant, the selecting can be based on an explicit indication from an access node.

In a variant, the switching can including switching from configuration A to configuration B or switching from configuration B to configuration A.

In a variant, the method can further comprise relying on an additional synchronization signal when switching from configuration B to configuration A.

In a variant the method can comprising relying on a timer when switching from configuration A to configuration B.

In a variant, configuration A can have one or more of the following attributes: search space(s) cover a wide bandwidth; search space(s) cover a high number of control channel elements; user equipment operates with a high number of physical downlink control channel blind decoding attempts per slot or per mini-slot (or per subframe); user equipment is monitoring all required physical downlink control channel from both slots and mini-slots; user equipment is operating with radio frequency bandwidth up to a bandwidth corresponding to maximum channel bandwidth; or user equipment has a large data volume in at least one link direction, either downlink or uplink In a variant, configuration B can have one or more of the following attributes: search space(s) cover a narrow bandwidth; search space(s) cover a low number of control channel elements; user equipment operates with a low number of physical downlink control channel blind decoding; user equipment is monitoring physical downlink control channel at maximum with slot resolution at least in discontinuous reception mode; user equipment is operating with radio frequency bandwidth corresponding to a subset of the maximum channel bandwidth; or user equipment is supporting a limited data volume in at least in at least one link direction, either downlink or uplink In a variant, the switching can be based on an explicit indication from an access node.

In a variant, the plurality of search space configurations can include a first search space configuration configured to support a user equipment in active data transmission.

In a variant, the plurality of search space configurations can include a second search space configuration configured to support a user equipment in discontinuous reception mode or in a low data rate service mode.

In a variant, the method can further include receiving configuration of the plurality search space configurations by higher layer signaling.

In a variant, the plurality of search space configurations can include a first search space configuration configured to cause the user equipment to follow all physical downlink control channel aggregation levels.

In a variant, the plurality of search space configurations can include a second search space configuration configured to cause the user equipment to follow only a subset of physical downlink control channel aggregation levels.

In a variant, the plurality of search space configurations can include a first search space configuration configured to cause the user equipment to follow both a common search space and a user specific search space.

In a variant, the plurality of search space configurations can include a second search space configuration configured to cause the user equipment to follow only a common search space.

In a variant, the plurality of search space configurations can include different user specific search spaces from one another.

In a variant, the operating of the user equipment can include performing physical downlink control channel blind detection.

According to a second embodiment, a method can include selecting a search space configuration from a plurality of search space configurations for a user equipment. The method can also include indicating to the user equipment the selected search space configuration. The plurality of search space configurations can respectively cover at least two different bandwidths.

In a variant, the method can also include sending an indication to the user equipment to switch to a different search space configuration of the plurality of search space configurations.

The second embodiment can also include any of the variants of the first embodiment.

According to third and fourth embodiments, an apparatus can include means for performing the method according to the first and second embodiments respectively, in any of their variants.

According to fifth and sixth embodiments, an apparatus can include at least one processor and at least one memory including computer program code. The at least one memory and the computer program code can be configured to, with the at least one processor, cause the apparatus at least to perform the method according to the first and second embodiments respectively, in any of their variants.

According to seventh and eighth embodiments, a computer program product may encode instructions for performing a process including the method according to the first and second embodiments respectively, in any of their variants.

According to ninth and tenth embodiments, a non-transitory computer readable medium may encode instructions that, when executed in hardware, perform a process including the method according to the first and second embodiments respectively, in any of their variants.

According to eleventh and twelfth embodiments, a system may include at least one apparatus according to the third or fifth embodiments in communication with at least one apparatus according to the fourth or sixth embodiments, respectively in any of their variants.

We claim:
1. An apparatus comprising:
at least one processor and at least one memory including computer program code;
the at least one memory and the computer program code are configured to, with the at least one processor, cause the apparatus at least to:
be configured with a plurality of search space configurations, wherein the apparatus is configured with at least one user specific search space configuration, wherein the plurality of search space configurations comprise a search space configuration supporting the apparatus in discontinuous reception mode;
select a search space configuration from the plurality of search space configurations for the apparatus;
operate the apparatus in the selected search space configuration, wherein the plurality of search space configurations cover at least two different bandwidths; and
switch between search space configurations,
wherein the switching is based on at least one of: a change in need for bandwidth, an expiration of a timer, or an explicit indication from an access node,
wherein the explicit indication is included in downlink control signalling or a medium access control (MAC) control element (CE), and
wherein the apparatus is a user equipment.
2. The apparatus according to claim 1, wherein the switching comprises switching from a first search space configuration to a second search space configuration or switching from a second search space configuration to a first search space configuration.

3. The apparatus according to claim 2, wherein the at least one memory and the computer program code are configured to, with the at least one processor, cause the apparatus at least to rely on a timer when switching from the first search space configuration to the second search space configuration, or rely on an additional synchronization signal when switching from the second search space configuration to the first search space configuration.

4. The apparatus according to claim 2, wherein the first search space configuration comprises one or more of the following attributes: search space(s) covering a wide bandwidth, search space(s) covering a high number of control channel elements, user equipment operating with a high number of physical downlink control channel blind decoding attempts per slot or per mini-slot or per subframe, user equipment monitoring all required physical downlink control channel from both slots and mini-slots, user equipment operating with radio frequency bandwidth up to a bandwidth corresponding to maximum channel bandwidth, or user equipment having a large data volume in at least one of a downlink direction or an uplink direction.

5. The apparatus according to claim 2, wherein the second search space configuration comprises one or more of the following attributes: search space(s) covering a narrow bandwidth, search space(s) covering a low number of control channel elements, user equipment operating with a low number of physical downlink control channel blind decoding, user equipment monitoring physical downlink control channel at maximum with slot resolution at least in discontinuous reception mode; user equipment operating with radio frequency bandwidth corresponding to a subset of the maximum channel bandwidth, or user equipment supporting a limited data volume in at least one of a downlink direction or an uplink direction.

6. The apparatus according to claim 1, wherein the selecting is based on at least one of need for bandwidth or an explicit indication from an access node.

7. The apparatus according to claim 1, wherein the plurality of search space configurations comprise a first search space configuration configured to support the apparatus in active data transmission and a second search space configuration wherein the second search space configuration is a search space configuration supporting the apparatus in discontinuous reception mode.

8. The apparatus according to claim 1, wherein the at least one memory and the computer program code are configured to, with the at least one processor, cause the apparatus at least to receive configuration of the plurality search space configurations from higher layer signaling.

9. The apparatus according to claim 1, wherein the plurality of search space configurations comprise a first search space configuration configured to cause the apparatus to follow all physical downlink control channel aggregation levels, and a second search space configuration configured to cause the apparatus to follow only a subset of physical downlink control channel aggregation levels.

10. The apparatus according to claim 1, wherein the plurality of search space configurations comprise a first search space configuration configured to cause the apparatus to follow both a common search space and a user specific search space, and a second search space configuration configured to cause the apparatus to follow only a common search space, or different user specific search spaces from one another.

11. The apparatus according to claim 1, wherein operating the apparatus comprises performing physical downlink control channel blind detection.

12. The apparatus according to claim 1, wherein the apparatus is configured with both a common search space configuration and the at least one user specific search configuration, and wherein the at least one user specific search configuration is defined based on dedicated radio resource control signaling.

13. An apparatus, comprising:
at least one processor and at least one memory including computer program code;
the at least one memory and the computer program code are configured to, with the at least one processor, cause the apparatus at least to:
configure a user equipment with a plurality of search space configurations including at least one user specific search space configuration, wherein the plurality of search space configurations comprise a search space configuration supporting the apparatus in discontinuous reception mode;
select a search space configuration from the plurality of search space configurations for the user equipment;
indicate to the user equipment the selected search space configuration, wherein the plurality of search space configurations cover at least two different bandwidths; and
send an indication to the user equipment to switch to a different search space configuration of the plurality of search space configurations,
wherein the switch is based on at least one of: a change in need for bandwidth, an expiration of a timer, or an explicit indication from the apparatus to the user equipment, and
wherein the explicit indication is included in downlink control signalling or a medium access control (MAC) control element (CE).

14. The apparatus according to claim 13, wherein the selecting is based on at least one of need for bandwidth or an explicit indication from an access node.

15. A method, comprising:
being configured with a plurality of search space configurations including at least one specific search space configuration, wherein the plurality of search space configurations comprise a search space configuration supporting a user equipment in discontinuous reception mode;
selecting a search space configuration from the plurality of search space configurations;
operating in the selected search space configuration, wherein the plurality of search space configurations cover at least two different bandwidths; and
switching between search space configurations,
wherein the switching is based on at least one of: a change in need for bandwidth, an expiration of a timer, or an explicit indication from an access node, and
wherein the explicit indication is included in downlink control signalling or a medium access control (MAC) control element (CE).

16. The method to claim 15, wherein the switching comprises switching from a first search space configuration to a second search space configuration or switching from the second search space configuration to the first search space configuration.

17. The method according to claim 15, wherein the plurality of search space configurations comprise a first search space configuration configured to support a user equipment in active data transmission and a second search space configuration, wherein the second search space configuration is the search space configuration supporting the user equipment in discontinuous reception mode.

18. The method to claim 15, wherein the first search space configuration comprises one or more of the following attributes: search space(s) covering a wider bandwidth compared to a bandwidth covered by search space of the second search space;
  search space(s) covering a higher number of control channel elements compared to a number of control channel elements of the second search space configuration; user equipment operating with a higher number of physical downlink control channel blind decoding attempts per slot or per mini-slot or per subframe compared to a number of physical downlink control channel blind decoding attempts of the second search space; user equipment monitoring all required physical downlink control channels from both slots and mini-slots; user equipment operating with radio frequency bandwidth up to a bandwidth corresponding to maximum channel bandwidth; or user equipment having a large data volume in at least one link direction, either downlink or uplink.

19. The method to claim 15, wherein the second search space configuration comprises one or more of the following attributes: search space(s) covering a narrower bandwidth compared to a bandwidth covered by a search space of the first search space configuration; search space(s) covering a lower number of control channel elements compared to a number of control channel elements of the first search space configuration; user equipment operating with a lower number of physical downlink control channel blind decoding attempts compared to a number of physical downlink control channel blind decoding attempts of the first search space configuration; user equipment monitoring a physical downlink control channel at maximum with slot resolution at least in discontinuous reception mode; user equipment operating with radio frequency bandwidth corresponding to a subset of maximum channel bandwidth; or user equipment supporting a limited data volume in at least one link direction, either downlink or uplink.

20. The method according to claim 15, wherein the apparatus is configured with both a common search space configuration and the at least one user specific search configuration, and wherein the at least one user specific search configuration is defined based on dedicated radio resource control signaling.

* * * * *

UNITED STATES PATENT AND TRADEMARK OFFICE
CERTIFICATE OF CORRECTION

PATENT NO. : 11,641,594 B2
APPLICATION NO. : 16/475564
DATED : May 2, 2023
INVENTOR(S) : Esa Tapani Tiirola et al.

It is certified that error appears in the above-identified patent and that said Letters Patent is hereby corrected as shown below:

In the Claims

In Column 12, Line 58, Claim 16, delete "The method to claim" and insert -- The method according to claim --, therefor.

In Column 13, Line 3, Claim 18, delete "The method to claim" and insert -- The method according to claim --, therefor.

In Column 13, Line 23, Claim 19, delete "The method to claim" and insert -- The method according to claim --, therefor.

Signed and Sealed this
Twenty-sixth Day of September, 2023

Katherine Kelly Vidal
*Director of the United States Patent and Trademark Office*